US012667895B2

(12) United States Patent
Novak et al.

(10) Patent No.: US 12,667,895 B2
(45) Date of Patent: *Jun. 30, 2026

(54) HOLE CUTTER WITH CHIP EGRESS APERTURE

(71) Applicant: BLACK & DECKER INC., New Britain, CT (US)

(72) Inventors: Joseph Thomas Novak, East Longmeadow, MA (US); Matthew Christopher Green, Amherst, MA (US)

(73) Assignee: BLACK & DECKER INC.

( * ) Notice: Subject to any disclaimer, the term of this patent is extended or adjusted under 35 U.S.C. 154(b) by 182 days.

This patent is subject to a terminal disclaimer.

(21) Appl. No.: 18/080,385

(22) Filed: Dec. 13, 2022

(65) Prior Publication Data

US 2023/0112552 A1     Apr. 13, 2023

Related U.S. Application Data

(63) Continuation of application No. 17/032,815, filed on Sep. 25, 2020, now abandoned, which is a
(Continued)

(51) Int. Cl.
B23B 51/04          (2006.01)

(52) U.S. Cl.
CPC .......... B23B 51/0467 (2022.01); B23B 51/04 (2013.01); B23B 51/0453 (2013.01);
(Continued)

(58) Field of Classification Search
CPC . B23B 51/0453; B23B 51/0467; B23B 51/04; Y10T 408/8953
See application file for complete search history.

(56) References Cited

U.S. PATENT DOCUMENTS

| | | |
|---|---|---|
| D44,561 S | 8/1913 | Gouck |
| 1,150,279 A | 8/1915 | Little |

(Continued)

FOREIGN PATENT DOCUMENTS

| | | | |
|---|---|---|---|
| AU | 2009225643 A1 | 9/2009 | |
| DE | 1652520 A1 * | 4/1971 | |

(Continued)

OTHER PUBLICATIONS

"Patent Owner's Notice of Withdrawal of Portions of its Motion to Exclude Evidence Under 37 C.F.R. 42.64 filed in Inter Partes Review No. IPR2015-01461 on Aug. 29, 2016".
(Continued)

*Primary Examiner* — Ryan Rufo
(74) *Attorney, Agent, or Firm* — Dickinson Wright PLLC

(57)          ABSTRACT

A hole cutter has a substantially cylindrical blade body defining a blade body circumference, a cutting edge formed on one end of the blade body, and an axially-elongated slot formed through the substantially cylindrical blade body. The axially-elongated slot is configured to receive chips flowing from the cutting edge within the interior of the blade body and (i) into the slot and/or (ii) through the slot, to prevent the collection of such chips within the interior of the blade body and/or at an interface between the blade body and the work piece. The axially-elongated slot defines a first end adjacent to the cutting edge, a second end axially spaced further from the cutting edge, and a slot area. The hole cutter further defines a total slot area to blade body circumference ratio within the range of about 0.1 to about 0.3 depending on the size of the hole cutter.

8 Claims, 6 Drawing Sheets

Related U.S. Application Data continuation of application No. 16/265,361, filed on Feb. 1, 2019, now Pat. No. 10,835,967, which is a continuation of application No. 15/709,614, filed on Sep. 20, 2017, now Pat. No. 10,259,051, which is a continuation of application No. 13/006,117, filed on Jan. 13, 2011, now Pat. No. 9,782,839, which is a continuation-in-part of application No. 12/687,078, filed on Jan. 13, 2010, now Pat. No. 9,808,869.

(52) U.S. Cl.
CPC ...... *Y10T 408/895* (2015.01); *Y10T 408/8953* (2015.01); *Y10T 408/896* (2015.01)

(56) References Cited

U.S. PATENT DOCUMENTS

| | | | |
|---|---|---|---|
| 1,194,503 A | 8/1916 | Jawoisch | |
| 1,234,468 A | 7/1917 | Hamilton | |
| 1,494,897 A | 5/1924 | Herman | |
| 1,564,105 A | 12/1925 | Ouellet | |
| 1,713,972 A | 5/1929 | Lufkin | |
| 1,994,516 A * | 3/1935 | Hawn | B23B 51/0473 |
| | | | 408/72 R |
| 2,179,029 A | 11/1939 | Ernest | |
| 2,312,176 A | 2/1943 | Kotowski | |
| 2,319,528 A | 5/1943 | Barbour et al. | |
| D139,299 S | 10/1944 | Walters | |
| 2,427,085 A | 9/1947 | Allison | |
| 2,473,077 A | 6/1949 | Starbuck, Jr. | |
| 2,482,439 A | 9/1949 | Smith | |
| D160,574 S | 10/1950 | Carlson | |
| 2,633,040 A | 3/1953 | Schlage | |
| 2,779,361 A * | 1/1957 | McKiff | B23B 31/113 |
| | | | 144/23 |
| 2,794,469 A | 6/1957 | Shortell | |
| 2,817,899 A | 12/1957 | Wheeler | |
| 2,852,967 A | 9/1958 | Mueller et al. | |
| 2,947,206 A | 8/1960 | Flanagan | |
| 2,969,122 A * | 1/1961 | Steffes | B23B 51/04 |
| | | | 175/426 |
| 3,162,067 A | 12/1964 | Koons et al. | |
| 3,220,449 A | 11/1965 | Franklin | |
| 3,221,709 A | 12/1965 | Racaj | |
| D204,877 S | 5/1966 | West | |
| 3,387,637 A | 6/1968 | Richard et al. | |
| 3,390,596 A | 7/1968 | Trevathan | |
| 3,495,359 A | 2/1970 | Smith et al. | |
| 3,593,419 A | 7/1971 | Hula | |
| 3,610,768 A | 10/1971 | Cochran | |
| 3,804,238 A | 4/1974 | Howard | |
| 3,810,514 A | 5/1974 | Viscovich | |
| 3,880,546 A | 4/1975 | Segal | |
| 3,929,050 A | 12/1975 | Salzwedel | |
| 3,973,862 A | 8/1976 | Segal | |
| 4,077,737 A * | 3/1978 | Morse | B23B 51/0426 |
| | | | 408/206 |
| 4,089,112 A | 5/1978 | Richards | |
| 4,180,909 A | 1/1980 | Lind | |
| 4,322,187 A * | 3/1982 | Hougen | B23B 51/04 |
| | | | 408/703 |
| D264,800 S | 6/1982 | Osada | |
| D266,735 S | 11/1982 | Hahn | |
| 4,408,935 A | 10/1983 | Miyanaga | |
| 4,541,758 A | 9/1985 | Frank et al. | |
| D281,979 S | 12/1985 | Meier | |
| D282,369 S | 1/1986 | De Villiers | |
| 4,595,321 A | 6/1986 | Van Dalen | |
| 4,631,829 A | 12/1986 | Schmidt et al. | |
| 4,651,425 A | 3/1987 | Livian | |
| 4,652,185 A | 3/1987 | Malrick | |
| 4,660,284 A | 4/1987 | Decarolis | |
| 4,755,087 A | 7/1988 | Parent | |
| 4,757,612 A | 7/1988 | Peyrot | |

| | | | |
|---|---|---|---|
| 4,760,643 A | 8/1988 | Juma | |
| D300,897 S | 5/1989 | Hagberg et al. | |
| D303,118 S | 8/1989 | Cox | |
| 4,891,884 A | 1/1990 | Torbet | |
| 5,007,777 A | 4/1991 | Itokazu | |
| D317,455 S | 6/1991 | Martin | |
| 5,044,393 A | 9/1991 | Jiles | |
| 5,049,010 A | 9/1991 | Oakes | |
| 5,058,620 A | 10/1991 | Jiles | |
| 5,061,126 A | 10/1991 | Cain et al. | |
| 5,082,403 A | 1/1992 | Sutton et al. | |
| D324,326 S | 3/1992 | Lu | |
| 5,171,111 A | 12/1992 | Kishimoto | |
| 5,205,675 A | 4/1993 | Hamel | |
| 5,205,685 A * | 4/1993 | Herbert | B23B 51/04 |
| | | | 408/207 |
| D342,270 S | 12/1993 | Kwang | |
| 5,351,595 A | 10/1994 | Johnston | |
| 5,360,300 A | 11/1994 | Sullivan | |
| D359,967 S | 7/1995 | Eichenberg et al. | |
| 5,451,128 A | 9/1995 | Hattersley | |
| D368,633 S | 4/1996 | Nakayama | |
| 5,597,274 A | 1/1997 | Behner | |
| 5,651,646 A | 7/1997 | Banke et al. | |
| D382,885 S | 8/1997 | Deiner et al. | |
| 5,676,501 A | 10/1997 | Peetz et al. | |
| D388,318 S | 12/1997 | Achterberg et al. | |
| D391,974 S | 3/1998 | Brutscher | |
| D392,297 S | 3/1998 | Brutscher | |
| 5,791,837 A | 8/1998 | Johnson | |
| 5,803,677 A | 9/1998 | Brutscher et al. | |
| 5,803,678 A | 9/1998 | Korb et al. | |
| 5,806,189 A | 9/1998 | Bailey | |
| 5,820,315 A | 10/1998 | Collard | |
| D401,822 S | 12/1998 | Pearlman | |
| D406,220 S | 3/1999 | Schmidt | |
| D408,831 S | 4/1999 | Mcgregor | |
| 5,904,454 A | 5/1999 | Washer | |
| 5,906,050 A | 5/1999 | Gilbert | |
| 5,909,930 A | 6/1999 | Ragland et al. | |
| D412,654 S | 8/1999 | Gilbert et al. | |
| D412,655 S | 8/1999 | Gilbert et al. | |
| D412,822 S | 8/1999 | Gilbert et al. | |
| D422,185 S | 4/2000 | Gold | |
| D423,038 S | 4/2000 | Shimoyama et al. | |
| 6,120,220 A | 9/2000 | Speare | |
| 6,152,661 A | 11/2000 | Thrasher | |
| D438,219 S | 2/2001 | Brutscher | |
| D443,495 S | 6/2001 | Wang | |
| D450,552 S | 11/2001 | Mason | |
| 6,341,925 B1 | 1/2002 | Despres | |
| 6,357,973 B2 | 3/2002 | Chao | |
| D455,057 S | 4/2002 | Medhurst | |
| 6,363,614 B1 | 4/2002 | Umstead et al. | |
| D457,269 S | 5/2002 | Arey | |
| D459,172 S | 6/2002 | Bissell | |
| 6,409,436 B1 | 6/2002 | Despres | |
| 6,438,849 B1 | 8/2002 | Wonderley | |
| D462,241 S | 9/2002 | Lothe | |
| 6,564,887 B2 * | 5/2003 | Hong | B28D 1/041 |
| | | | 175/405 |
| 6,578,268 B2 | 6/2003 | Hawketts | |
| 6,588,992 B2 | 7/2003 | Rudolph | |
| 6,599,063 B1 | 7/2003 | Capstran | |
| D478,105 S | 8/2003 | Morton et al. | |
| D478,106 S | 8/2003 | Morton et al. | |
| D478,339 S | 8/2003 | Morton et al. | |
| D478,919 S | 8/2003 | Morton et al. | |
| 6,623,220 B2 | 9/2003 | Nuss et al. | |
| 6,641,338 B2 | 11/2003 | Despres | |
| 6,676,343 B2 | 1/2004 | Burk | |
| 6,708,410 B2 | 3/2004 | Okada | |
| 6,718,640 B1 | 4/2004 | John | |
| 6,746,187 B2 | 6/2004 | Alm | |
| 6,786,684 B1 | 9/2004 | Ecker | |
| 6,820,519 B2 | 11/2004 | Lefebvre | |
| 6,857,831 B2 | 2/2005 | Davis | |
| 6,883,968 B2 | 4/2005 | Fugel et al. | |
| 6,893,194 B2 | 5/2005 | Jones et al. | |

(56) References Cited

U.S. PATENT DOCUMENTS

| | | | |
|---|---|---|---|
| D508,389 S | 8/2005 | Polk | |
| 6,948,574 B2 * | 9/2005 | Cramer | B24B 1/04 |
| | | | 408/206 |
| 6,948,890 B2 * | 9/2005 | Svensson | B23B 51/06 |
| | | | 408/59 |
| 7,003,833 B2 | 2/2006 | Feliciano | |
| D516,594 S | 3/2006 | Morton | |
| D517,894 S | 3/2006 | Kondo et al. | |
| 7,097,397 B2 | 8/2006 | Keightley | |
| 7,101,124 B2 | 9/2006 | Keightley | |
| 7,127,979 B2 | 10/2006 | Kocher et al. | |
| 7,160,064 B2 | 1/2007 | Jasso | |
| 7,163,362 B2 | 1/2007 | Keightley | |
| 7,189,036 B1 | 3/2007 | Watson | |
| D539,616 S | 4/2007 | Taylor et al. | |
| 7,237,291 B2 | 7/2007 | Redford | |
| 7,258,513 B2 | 8/2007 | Gertner | |
| D551,269 S | 9/2007 | Burke, III | |
| D559,044 S | 1/2008 | Ono | |
| D562,651 S | 2/2008 | Harkey | |
| 7,340,836 B2 | 3/2008 | Whitemiller et al. | |
| D565,382 S | 4/2008 | Watanabe | |
| D588,175 S | 3/2009 | Morton | |
| 7,553,114 B2 | 6/2009 | Oknestam et al. | |
| 7,556,459 B2 | 7/2009 | Rompel | |
| 7,611,312 B2 | 11/2009 | Miyanaga | |
| 7,621,703 B2 | 11/2009 | Keightley | |
| 7,637,703 B2 | 12/2009 | Khangar et al. | |
| 7,658,136 B2 | 2/2010 | Rompel et al. | |
| 7,658,576 B1 | 2/2010 | Buzdum et al. | |
| 7,661,913 B2 | 2/2010 | Nordlin | |
| 7,674,078 B1 | 3/2010 | Buzdum et al. | |
| D620,035 S | 7/2010 | Eades | |
| 7,785,047 B2 | 8/2010 | Jauch | |
| D624,808 S | 10/2010 | Krawczak et al. | |
| 7,818,867 B1 | 10/2010 | Capstran et al. | |
| 7,824,137 B2 | 11/2010 | Vasudeva et al. | |
| 7,850,405 B2 | 12/2010 | Keightley | |
| D631,732 S | 2/2011 | Krawczak et al. | |
| 7,886,445 B2 | 2/2011 | Constantine et al. | |
| 7,921,568 B2 | 4/2011 | Green | |
| 7,934,893 B2 | 5/2011 | Gillissen | |
| 7,959,371 B2 | 6/2011 | Keightley | |
| 7,967,535 B2 | 6/2011 | Eiserer et al. | |
| D644,327 S | 8/2011 | Singh | |
| 8,052,356 B2 * | 11/2011 | Singh | B23B 51/0453 |
| | | | 408/67 |
| 8,079,787 B2 | 12/2011 | Chao | |
| 8,113,748 B2 | 2/2012 | Werner | |
| 8,123,443 B2 | 2/2012 | Khangar et al. | |
| D659,176 S | 5/2012 | Novak et al. | |
| D664,574 S | 7/2012 | Burke, III | |
| 8,221,037 B2 | 7/2012 | Neitzell | |
| D687,472 S | 8/2013 | Novak et al. | |
| D690,334 S | 9/2013 | Zielonka et al. | |
| D692,470 S | 10/2013 | Novak et al. | |
| 8,573,907 B2 | 11/2013 | Kalomeris et al. | |
| 8,579,554 B2 | 11/2013 | Novak et al. | |
| 8,579,555 B2 | 11/2013 | Novak et al. | |
| 8,646,601 B2 | 2/2014 | Green et al. | |
| D701,544 S | 3/2014 | Novak et al. | |
| 8,684,641 B2 | 4/2014 | Moffatt | |
| 8,696,268 B2 | 4/2014 | Bell et al. | |
| D706,845 S | 6/2014 | Richter | |
| 8,739,414 B2 | 6/2014 | Tyers | |
| D708,650 S | 7/2014 | Richter | |
| D711,441 S | 8/2014 | Novak et al. | |
| 9,022,703 B2 | 5/2015 | Keightley | |
| 9,120,162 B2 | 9/2015 | Keightley | |
| 9,233,424 B2 | 1/2016 | Grolimund et al. | |
| 9,248,513 B2 | 2/2016 | Lai | |
| 9,724,766 B2 | 8/2017 | Novak et al. | |
| 9,782,839 B2 | 10/2017 | Novak et al. | |
| 9,808,869 B2 | 11/2017 | Novak et al. | |
| 9,884,374 B2 | 2/2018 | Novak et al. | |

| | | | |
|---|---|---|---|
| 10,137,507 B2 | 11/2018 | Novak et al. | |
| 10,259,051 B2 | 4/2019 | Novak et al. | |
| 10,500,651 B2 | 12/2019 | Novak et al. | |
| 10,835,967 B2 | 11/2020 | Novak et al. | |
| 2002/0037201 A1 | 3/2002 | Despres | |
| 2002/0121023 A1 | 9/2002 | Kocher et al. | |
| 2002/0122703 A1 | 9/2002 | Czyzewski et al. | |
| 2003/0084575 A1 | 5/2003 | Chen | |
| 2003/0088985 A1 | 5/2003 | Huang | |
| 2003/0094078 A1 | 5/2003 | Clanton | |
| 2003/0200661 A1 | 10/2003 | Okada | |
| 2004/0042861 A1 | 3/2004 | Capstran | |
| 2005/0022390 A1 | 2/2005 | Whitemiller et al. | |
| 2005/0050734 A1 | 3/2005 | Kesinger | |
| 2005/0172416 A1 | 8/2005 | Feliciano | |
| 2005/0193566 A1 | 9/2005 | Brown et al. | |
| 2005/0214086 A1 | 9/2005 | Nicholas | |
| 2005/0244238 A1 | 11/2005 | Burk | |
| 2005/0262702 A1 | 12/2005 | Hawthorn | |
| 2006/0016315 A1 * | 1/2006 | Zorich | B23D 61/123 |
| | | | 83/835 |
| 2006/0130629 A1 | 6/2006 | Rompel et al. | |
| 2006/0285934 A1 | 12/2006 | Keightley | |
| 2007/0003386 A1 | 1/2007 | Keightley | |
| 2007/0036620 A1 | 2/2007 | Keightley | |
| 2007/0110527 A1 | 5/2007 | Jasso | |
| 2007/0115027 A1 | 5/2007 | Bertin | |
| 2007/0166116 A1 | 7/2007 | Olson et al. | |
| 2007/0212179 A1 | 9/2007 | Khangar et al. | |
| 2007/0227012 A1 | 10/2007 | Constantine et al. | |
| 2007/0245574 A1 | 10/2007 | Green | |
| 2007/0269280 A1 | 11/2007 | Vasudeva et al. | |
| 2008/0019785 A1 | 1/2008 | Keightley | |
| 2008/0050189 A1 | 2/2008 | Keightley | |
| 2008/0131223 A1 | 6/2008 | Jauch | |
| 2008/0181738 A1 | 7/2008 | Capriotti et al. | |
| 2008/0187405 A1 | 8/2008 | Nordlin | |
| 2008/0260480 A1 | 10/2008 | Keightley | |
| 2009/0035082 A1 * | 2/2009 | Singh | B25B 9/00 |
| | | | 408/204 |
| 2009/0044674 A1 * | 2/2009 | Neitzell | B27B 5/12 |
| | | | 83/495 |
| 2009/0106909 A1 | 4/2009 | Tyers | |
| 2009/0169317 A1 | 7/2009 | Rae | |
| 2009/0252567 A1 | 10/2009 | Gillissen | |
| 2009/0304468 A1 | 12/2009 | Duggan | |
| 2009/0326539 A1 * | 12/2009 | Neumeyer | A61B 17/1637 |
| | | | 606/80 |
| 2010/0034608 A1 | 2/2010 | Nordlin et al. | |
| 2010/0047030 A1 | 2/2010 | Eiserer et al. | |
| 2010/0067995 A1 | 3/2010 | Keightley | |
| 2010/0080665 A1 | 4/2010 | Keightley | |
| 2010/0086372 A1 | 4/2010 | Werner | |
| 2010/0247258 A1 | 9/2010 | Keightley | |
| 2010/0310332 A1 | 12/2010 | Serba | |
| 2011/0027030 A1 | 2/2011 | Capstran et al. | |
| 2011/0052340 A1 | 3/2011 | Kozak | |
| 2011/0170965 A1 | 7/2011 | Novak et al. | |
| 2011/0170966 A1 | 7/2011 | Novak et al. | |
| 2011/0170967 A1 | 7/2011 | Novak et al. | |
| 2011/0170969 A1 | 7/2011 | Novak et al. | |
| 2011/0170970 A1 | 7/2011 | Kalomeris et al. | |
| 2011/0170971 A1 | 7/2011 | Novak et al. | |
| 2011/0170972 A1 | 7/2011 | Zielonka et al. | |
| 2011/0217133 A1 | 9/2011 | Ibarra et al. | |
| 2011/0243675 A1 | 10/2011 | Fach | |
| 2012/0009032 A1 | 1/2012 | Grussenmeyer | |
| 2012/0183366 A1 | 7/2012 | Stenman | |
| 2014/0023446 A1 | 1/2014 | Piller et al. | |

FOREIGN PATENT DOCUMENTS

| | | | | |
|---|---|---|---|---|
| DE | 20101718 U1 | 5/2001 | | |
| EP | 0295309 A1 | 12/1988 | | |
| EP | 1080859 A1 * | 3/2001 | | B28D 1/041 |
| GB | 2310623 A * | 9/1997 | | B23B 31/113 |
| JP | H07124809 A | 5/1995 | | |
| JP | 2006321024 A | 11/2006 | | |

(56)                  References Cited

FOREIGN PATENT DOCUMENTS

| NL | 9400753 A | * 12/1995 | ......... B23B 51/0406 |
| WO | 9731743 A1 | 9/1997 | |
| WO | 2009015488 A1 | 2/2009 | |

OTHER PUBLICATIONS

"Fulcrum"—Webster's Dictionary—Merrriam-Webster. 2009, p. 139.

Bi-Metal Hole Saw 825-2Package Greenlee Textron Inc. Rockford, Illinois, 2003.

Coja, Michael—Extended European Search Report re corresponding application No. EP19201282.1-1019—Dec. 19, 2019—5 pages—European Patent Office Munich Germany.

Communication issued in European application No. 11733410.2, dated Nov. 23, 2016—5 pages.

Decision—Institution of Inter Partes Review issued in Inter Partes Review No. IPR2015-01462 on Nov. 30, 2015.

Decision—Institution of Inter Partes Review issued in Partes Review No. IPR2015-01461 on Nov. 30, 2015.

Decision—Request for Rehearing issued in filed in Inter Partes Review No. IPR2015-01462 on Jan. 15, 2016.

Declaration of James Pangerc from Petition for Inter Partes Review of U.S. Pat. No. 8,579,554—Signed and Dated Jun. 22, 2015—11 pages.

Exhibit 1002 (Declaration of James Pangerc) filed in Inter Partes Review No. IPR2015-01461 on Jun. 22, 2015.

Exhibit 1002 (Declaration of James Pangerc) filed in Inter Partes Review No. IPR2015-01462 on Jun. 22, 2015.

Exhibit 1006 (Webster's Dictionary Page) filed in Inter Partes Review No. IPR2015-01461 on Jun. 22, 2015.

Exhibit 1006 (Webster's Dictionary page) filed in Inter Partes Review No. IPR2015-01462 on Jun. 22, 2015.

Exhibit 1007 (Office Action issued in U.S. Appl. No. 12/687,065 on Mar. 5, 2013) filed in Inter Partes Review No. IPR2015-01461 on Jun. 22, 2015.

Exhibit 1007 (Office Action issued in U.S. Appl. No. 13/006,080 on Mar. 5, 2013) filed in Inter Partes Review No. IPR2015-01462 on Jun. 22, 2015.

Exhibit 1008 (Deposition Transcript of Glenn Vallee) filed in Inter Partes Review No. IPR2015-01462 on Jun. 15, 2016.

Exhibit 1009 (Deposition Transcript of Joseph T. Novak) filed in Inter Partes Review No. IPR2015-01461 on Jun. 15, 2016.

Exhibit 1009 (Deposition Transcript of Joseph T. Novak) filed in Inter Partes Review No. IPR2015-01462 on Jun. 15, 2016.

Exhibit 1010 (Declaration of Andrew Dufresne) filed in Inter Partes Review No. IPR2015-01461 on Jun. 15, 2016.

Exhibit 1010 (Declaration of Andrew Dufresne) filed in Inter Partes Review No. IPR2015-01462 on Jun. 15, 2016.

Exhibit 1011 (Printed copy of lenoxtools.com webpage describing LENOX Diamond™ Hole Saws) filed in Inter Partes Review No. IPR2015-01461 on Jun. 15, 2016.

Exhibit 1011 (Printed copy of lenoxtools.com webpage describing LENOX Diamond™ Hole Saws) filed in Inter Partes Review No. IPR2015-01462 on Jun. 15, 2016.

Exhibit 1012 (Printed copy of lenoxtools.com webpage describing LENOX Carbide Tipped Hole Saws) filed in Inter Partes Review No. IPR2015-01461 on Jun. 15, 2016.

Exhibit 1012 (Printed copy of lenoxtools.com webpage describing LENOX Carbide Tipped Hole Saws) filed in Inter Partes Review No. IPR2015-01462 on Jun. 15, 2016.

Exhibit 1013 (Printed copy of lenoxtools.com webpage describing LENOX Carbide Grit Hole Saws) filed in Inter Partes Review No. IPR2015-01461 on Jun. 15, 2016.

Exhibit 1013 (Printed copy of lenoxtools.com webpage describing LENOX Carbide Grit Hole Saws) filed in Inter Partes Review No. IPR2015-01462 on Jun. 15, 2016.

Exhibit 1014 (Printed copy of lenoxtools.com webpage describing LENOX One Tooth® Rough Wood Hole Cutter filed in Inter Partes Review No. IPR2015-01461 on Jun. 15, 2016.

Exhibit 1014 (Printed copy of lenoxtools.com webpage describing LENOX One Tooth® Rough Wood Hole Cutter filed in Inter Partes Review No. IPR2015-01462 on Jun. 15, 2016.

Exhibit 1015 (Printed copy of lenoxtools.com webpage describing LENOX Carbide Grit Recessed Lighting Hole Saws) filed in Inter Partes Review No. IPR2015-01461 on Jun. 15, 2016.

Exhibit 1015 (Printed copy of lenoxtools.com webpage describing LENOX Carbide Grit Recessed Lighting Hole Saws) filed in Inter Partes Review No. IPR2015-01462 on Jun. 15, 2016.

Exhibit 1016 (Declaration of Andrew Dufresne) filed in Inter Partes Review No. IPR2015-01461 on Aug. 5, 2016.

Exhibit 1016 (Declaration of Andrew Dufresne) filed in Inter Partes Review No. IPR2015-01462 on Aug. 5, 2016.

Exhibit 1017 (Printed copy of e-mail from Counsel for Petitioners to Counsel for Patent Owner) filed in Inter Partes Review No. IPR2015-01461 on Aug. 5, 2016.

Exhibit 1017 (Printed copy of e-mail from Counsel for Petitioners to Counsel for Patent Owner) filed in Inter Partes Review No. IPR2015-01462 on Aug. 5, 2016.

Exhibit 1018 (Petitioner's Demonstrative Exhibit for Oral Hearing) filed in Inter Partes Review No. IPR2015-01462 on Aug. 24, 2016.

Exhibit 1018 (Petitioners' Demonstrative Exhibit for Oral Hearing) filed in Inter Partes Review No. IPR2015-01461 on Aug. 24, 2016.

Exhibit 2002 (Response to Non-Final Office Action filed in U.S. Appl. No. 12/687,065 on Jul. 5, 2013) filed in Inter Partes Review No. IPR2015-01461 on Mar. 15, 2016.

Exhibit 2002 (Response to Non-Final Office Action filed in U.S. Appl. No. 13/006,680 on Jul. 5, 2013) filed in Inter Partes Review No. IPR2015-01462 on Mar. 15, 2016.

Exhibit 2003 (Deposition Transcript from Cross-Examination of James Pangerc taken on Feb. 19, 2016) filed in Inter Partes Review No. IPR2015-01461 on Mar. 15, 2016.

Exhibit 2003 (Deposition Transcript from Cross-Examination of James Pangerc taken on Feb. 19, 2016) filed in Inter Partes Review No. IPR2015-01462 on Mar. 15, 2016.

Exhibit 2004 (Declaration of Glenn E. Vallee dated Mar. 15, 2016) filed in Inter Partes Review No. IPR2015-01461 on Mar. 15, 2016.

Exhibit 2004 (Declaration of Glenn E. Vallee dated Mar. 15, 2016) filed in Inter Partes Review No. IPR2015-01462 on Mar. 15, 2016.

Exhibit 2005 (Curriculum Vitae [CV] of Glenn E. Vallee) filed in Inter Partes Review No. IPR2015-01461 on Mar. 15, 2016.

Exhibit 2005 (Curriculum Vitae [CV] of Glenn E. Vallee) filed in Inter Partes Review No. IPR2015-01462 on Mar. 15, 2016.

Exhibit 2006 (Declaration of Joseph Thomas Novak dated Mar. 15, 2016) filed in Inter Partes Review No. IPR2015-01461 on Mar. 15, 2016.

Exhibit 2006 (Declaration of Joseph Thomas Novak dated Mar. 15, 2016) filed in Inter Partes Review No. IPR2015-01462 on Mar. 15, 2016.

Exhibit 2007 (Curriculam Vitae [CV] of Joseph Thomas Novak) filed in Inter Partes Review No. IPR2015-01461 on Mar. 15, 2016.

Exhibit 2007 (Curriculum Vitae [CV] of Joseph Thomas Novak) filed in Inter Partes Review No. IPR2015-01462 on Mar. 15, 2016.

Exhibit 2008 (Declaration of Matthew K. Lacroix dated Mar. 15, 2016) filed in Inter Partes Review No. IPR2015-01461 on Mar. 15, 2016.

Exhibit 2008 (Declaration of Matthew K. Lacroix dated Mar. 15, 2016) filed in Inter Partes Review No. IPR2015-01462 on Mar. 15, 2016.

Exhibit 2009 (Attachment to Declaration of Matthew K. Lacroix) filed in Inter Partes Review No. IPR2015-01461 on Mar. 15, 2016.

Exhibit 2009 (Attachment to Declaration of Matthew K. Lacroix) filed in Inter Partes Review No. IPR2015-01462 on Mar. 15, 2016.

Exhibit 2010 (Attorney annotated comparison of Figure 4 of the '554 patent and Figure 2 from Redford) filed in Inter Partes Review No. IPR2015-01461 on Mar. 15, 2016.

Exhibit 2010 (Attorney annotated comparison of Figure 4 of the '554 patent and Figure 2 from Redford) filed in Inter Partes Review No. IPR2015-01462 on Mar. 15, 2016.

Exhibit 2011 (White Paper entitled "LENOX Bi-Metal SPEED-SLOTTM Hole Saw Up to 2X Life in Metal" dated 2011) filed in Inter Partes Review No. IPR2015-01461 on Mar. 15, 2016.

(56)                    References Cited

OTHER PUBLICATIONS

Exhibit 2011 (White Paper entitled "LENOX Bi-Metal SPEED-SLOTTM Hole Saw Up to 2X Life in Metal" dated 2011) filed in Inter Partes Review No. IPR2015-01462 on Mar. 15, 2016.
Exhibit 2012 (Patent Owner's Demonstratives for Oral Hearing) filed in Inter Partes Review No. IPR2015-01461 on Aug. 24, 2016.
Exhibit 2012 (Patent Owner's Demonstratives for Oral Hearing) filed in Inter Partes Review No. IPR2015-01462 on Aug. 24, 2016.
Extended European Search Report issued in application No. 11733410.2 dated Mar. 19, 2014—6 pages.
Final Written Decision issued in Inter Partes Review No. IPR2015-01461 on Sep. 29, 2016.
Final Written Decision issued in Inter Partes Review No. IPR2015-01462 on Sep. 29, 2016.
Flexible Bi-Metal Hacksaw Blade H888 2008 available at http://www.alibaba.com- productsgs/210815366/Flexible_bi_metal_hacksaw_blade_H888.html accessed on Nov. 6, 2008.
International Search Report and Written Opinion for International Application No. PCT/US2011/021219 mailed Apr. 26, 2011.
International Search Report and Written Opinion of the International Searching Authority for International Application No. PCT/US2011/021217, mailed Mar. 9, 2011.
Office Action issued in U.S. Appl. No. 12/678,065 on Mar. 5, 2013.
Office Action issued in U.S. Appl. No. 12/687,078 on Apr. 11, 2016.
Patent Owner's Exhibit List filed in Inter Partes Review No. IPR2015-01461 on Aug. 24, 2016.
Patent Owner's Exhibit List filed in Inter Partes Review No. IPR2015-01461 on Mar. 15, 2016.
Patent Owner's Exhibit List filed in Inter Partes Review No. IPR2015-01462 on Aug. 24, 2016.
Patent Owner's Exhibit List filed in Inter Partes Review No. IPR2015-01462 on Mar. 15, 2016.
Patent owner's Motion to Exclude Evidence Under 37 C.F.R. 42.64 filed in Inter Partes Review No. IPR2015-01461 on Jul. 22, 2016.
Patent owner's Motion to Exclude Evidence Under 37 C.F.R. 42.64 filed in Inter Partes Review No. IPR2015-01462 on Jul. 22, 2016.
Patent Owner's Notice of Withdrawal of Portions of Its Motion to Exclude Evidence Under 37 C.F.R. 42.64 Inter Partes Review No. IPR2015-01462 on Aug. 29, 2016.
Patent Owner's Objections to Evidence Submitted with Petition filed in filed in Inter Partes Review No. IPR2015-01462 on Dec. 14, 2015.
Patent Owner's Objections to Evidence Submitted with Petition filed in Inter Partes Review No. IPR2015-01461 on Dec. 14, 2015.
Patent Owner's Reply to Petitioner's Opposition to Patent Owner's Motion to Exclude Evidence filed in Inter Partes Review No. IPR2015-01461 on Aug. 12, 2016.
Patent Owner's Reply to Petitioner's Opposition to Patent Owner's Motion to Exclude Evidence filed in Inter Partes Review No. IPR2015-01462 on Aug. 12, 2016.
Patent Owner's Response filed in Inter Partes Review No. IPR2015-01461 on Mar. 15, 2016.
Patent Owner's Response, filed in Inter Partes Review No. IPR2015-01462 on Mar. 15, 2016.
Patent Owner's Supplemental Objections to Evidence Submitted with Petition filed in Inter Partes Review No. IPR2015-01461 on Feb. 26, 2016.
Patent Owner's Supplemental Objections to Evidence Submitted with Petition filed in Inter Partes Review No. IPR2015-01462 on Feb. 26, 2016.
Petition for Inter Partes Review of U.S. Pat. No. 8,579,554 Under U.S.C. 311-319 filed in Inter Partes Review No. IPR2015-01461 on Jun. 22, 2015.
Petition for Inter Partes Review of U.S. Pat. No. 8,579,554 Under U.S.C. 311-319, filed in Inter Partes Review No. IPR2015-01462 on Jun. 22, 2015.
Petition for Inter Partes Review of U.S. Pat. No. 8,579,555 under U.S.C. 311-319 filed in Inter Partes Review No. IPR2015-01462 on Mar. 15, 2016.
Petition for Inter Partes Review of U.S. Pat. No. 8,579,554, filed Jun. 22, 2015—55 pages.
Petitioner's Exhibit List filed in Inter Partes Review No. IPR2015-01461 on Jun. 15, 2016.
Petitioner's Exhibit List in filed in Inter Partes Review No. IPR2015-01461 on Aug. 5, 2016.
Petitioner's Exhibit List in filed in Inter Partes Review No. IPR2015-01462 on Aug. 5, 2016.
Petitioner's Opposition to Patent Owner's Motion to Exclude Evidence filed in Inter Partes Review No. IPR2015-01461 on Aug. 5, 2016.
Petitioner's Reply filed in Inter Partes Review No. IPR2015-01461 on Jun. 15, 2016.
Petitioner's Reply filed in Inter Partes Review No. IPR2015-01462 on Jun. 15, 2016.
Petitioner's Request for Rehearing under 37 C.F.R. 42.71(d) filed in Inter Partes Review No. IPR2015-01462 on Dec. 9, 2015.
Petitioners Opposition to Patent Owner's Motion to Exclude Evidence filed in Inter Partes Review No. IPR2015-01462 on Aug. 5, 2016.
William Henry B04 Pikatti Knife available at http://www.onlyfineknives.com/knife.php?k=224451 accessed Nov. 6, 2008.
"Amazon.com, Milwaukee 49-56-0203 3-3/4-Inch Ice Hardened Hole Saw", https://www.amazon.com/Milwaukee-49-56-0203-4-Inch-Hardened-Hole/dp/B0017WOBDW/ref=sr_1_22?keywords=milwaukee+ice+hole+saw&qid=1585581808&s=hi&sr=1-22) (Printed Mar. 30, 2020; listing an available date of Jan. 16, 2007).

* cited by examiner

FIG. 4

| Hole Cutter Size | No. of Angled Axially-Extending Slots | No. of Substantially Vertical Axially-Extending Slots | Slot Area (in^2) | Nominal Circumference (in) | Nominal Shell Area (in^2) | Total Slot Area / Nominal Circumference Ratio (in) | Total Slot Area / Total Nominal Shell Area |
|---|---|---|---|---|---|---|---|
| 9/16 | 0 | 1 | 0.42115 | 1.7672 | 3.2975 | 0.2383 | 13% |
| 5/8 | 0 | 1 | 0.42115 | 1.9635 | 3.6639 | 0.2145 | 11% |
| 11/16 | 0 | 1 | 0.42115 | 2.1598 | 4.0303 | 0.1950 | 10% |
| 3/4 | 0 | 1 | 0.42115 | 2.3562 | 4.3967 | 0.1787 | 10% |
| 20mm | 0 | 1 | 0.42115 | 2.4737 | 4.6159 | 0.1703 | 9% |
| 13/16 | 0 | 1 | 0.42115 | 2.5525 | 4.7631 | 0.1650 | 9% |
| 7/8 | 0 | 2 | 0.8423 | 2.7489 | 5.1294 | 0.3064 | 16% |
| 15/16 | 0 | 2 | 0.8423 | 2.9452 | 5.4958 | 0.2860 | 15% |
| 1 | 0 | 2 | 0.8423 | 3.1416 | 5.8622 | 0.2681 | 14% |
| 1-1/16 | 0 | 2 | 0.8423 | 3.3379 | 6.2286 | 0.2523 | 14% |
| 1-1/8 | 0 | 2 | 0.8423 | 3.5343 | 6.5950 | 0.2383 | 13% |
| 1-3/16 | 0 | 2 | 0.8423 | 3.7306 | 6.9614 | 0.2258 | 12% |
| 1-1/4 | 0 | 2 | 0.8423 | 3.9270 | 7.3278 | 0.2145 | 11% |
| 1-5/16 | 0 | 2 | 0.8423 | 4.1233 | 7.6942 | 0.2043 | 11% |
| 1-3/8 | 0 | 2 | 0.8423 | 4.3197 | 8.0605 | 0.1950 | 10% |
| 1-7/16 | 0 | 2 | 0.8423 | 4.5160 | 8.4269 | 0.1865 | 10% |
| 1-1/2 | 2 | 0 | 1.1274 | 4.7124 | 8.7933 | 0.2392 | 13% |
| 1-9/16 | 2 | 0 | 1.1274 | 4.9087 | 9.1597 | 0.2297 | 12% |
| 1-5/8 | 2 | 0 | 1.1274 | 5.1051 | 9.5261 | 0.2208 | 12% |
| 1-11/16 | 2 | 0 | 1.1274 | 5.3014 | 9.8925 | 0.2127 | 11% |
| 1-3/4 | 2 | 0 | 1.1274 | 5.4978 | 10.2589 | 0.2051 | 11% |
| 1-13/16 | 2 | 0 | 1.1274 | 5.6941 | 10.6253 | 0.1980 | 11% |
| 1-7/8 | 2 | 0 | 1.1274 | 5.8905 | 10.9917 | 0.1914 | 10% |
| 2 | 2 | 0 | 1.1274 | 6.2832 | 11.7244 | 0.1794 | 10% |
| 2-1/16 | 2 | 0 | 1.1274 | 6.4795 | 12.0908 | 0.1740 | 9% |
| 2-1/8 | 2 | 0 | 1.1274 | 6.6759 | 12.4572 | 0.1689 | 9% |
| 56mm | 2 | 0 | 1.1274 | 6.9264 | 12.9246 | 0.1628 | 9% |
| 2-1/4 | 2 | 0 | 1.1274 | 7.0686 | 13.1900 | 0.1595 | 9% |
| 2-3/8 | 2 | 0 | 1.1274 | 7.4613 | 13.9228 | 0.1511 | 8% |
| 62mm | 2 | 0 | 1.1274 | 7.6685 | 14.3093 | 0.1470 | 8% |

*FIG. 4 - Cont.*

| Hole Cutter Size | No. of Angled Axially-Extending Slots | No. of Substantially Vertical Axially-Extending Slots | Slot Area (in^2) | Nominal Circumference (in) | Nominal Shell Area (in^2) | Total Slot Area / Nominal Circumference Ratio (in) | Total Slot Area / Total Nominal Shell Area |
|---|---|---|---|---|---|---|---|
| 2-1/2 | 2 | 0 | 1.1274 | 7.8540 | 14.6555 | 0.1435 | 8% |
| 2-5/16 | 2 | 0 | 1.1274 | 7.2649 | 13.5564 | 0.1552 | 8% |
| 2-9/16 | 2 | 0 | 1.1274 | 8.0503 | 15.0219 | 0.1400 | 8% |
| 2-5/8 | 2 | 0 | 1.1274 | 8.2467 | 15.3883 | 0.1367 | 7% |
| 68mm | 2 | 0 | 1.1274 | 8.4106 | 15.6941 | 0.1340 | 7% |
| 2-3/4 | 2 | 0 | 1.1274 | 8.6394 | 16.1211 | 0.1305 | 7% |
| 2-7/8 | 2 | 0 | 1.1274 | 9.0321 | 16.8539 | 0.1248 | 7% |
| 3 | 2 | 0 | 1.1274 | 9.4248 | 17.5866 | 0.1196 | 6% |
| 3-1/8 | 2 | 0 | 1.1274 | 9.8175 | 18.3194 | 0.1148 | 6% |
| 3-1/4 | 2 | 0 | 1.1274 | 10.2102 | 19.0522 | 0.1104 | 6% |
| 3-3/8 | 2 | 0 | 1.1274 | 10.6029 | 19.7850 | 0.1063 | 6% |
| 3-1/2 | 4 | 0 | 2.2548 | 10.9956 | 20.5177 | 0.2051 | 11% |
| 3-5/8 | 4 | 0 | 2.2548 | 11.3883 | 21.2505 | 0.1980 | 11% |
| 3-3/4 | 4 | 0 | 2.2548 | 11.7810 | 21.9833 | 0.1914 | 10% |
| 3-7/8 | 4 | 0 | 2.2548 | 12.1737 | 22.7161 | 0.1852 | 10% |
| 4 | 4 | 0 | 2.2548 | 12.5664 | 23.4489 | 0.1794 | 10% |
| 4-1/8 | 4 | 0 | 2.2548 | 12.9591 | 24.1816 | 0.1740 | 9% |
| 4-1/4 | 4 | 0 | 2.2548 | 13.3518 | 24.9144 | 0.1689 | 9% |
| 4-3/8 | 4 | 0 | 2.2548 | 13.7445 | 25.6472 | 0.1641 | 9% |
| 4-1/2 | 4 | 0 | 2.2548 | 13.1947 | 24.6213 | 0.1709 | 9% |
| 4-5/8 | 4 | 0 | 2.2548 | 14.5299 | 27.1127 | 0.1552 | 8% |
| 4-3/4 | 4 | 0 | 2.2548 | 14.9226 | 27.8455 | 0.1511 | 8% |
| 5 | 4 | 0 | 2.2548 | 15.7080 | 29.3111 | 0.1435 | 8% |
| 5-1/2 | 4 | 0 | 2.2548 | 17.2788 | 32.2422 | 0.1305 | 7% |
| 6 | 4 | 0 | 2.2548 | 18.8496 | 35.1733 | 0.1196 | 6% |
| Min | | | 0.42115 | 1.7672 | 3.2975 | 0.1063 | 6% |
| Max | | | 2.2548 | 18.8496 | 35.1733 | 0.3064 | 16% |

*FIG. 6*

| Hole Cutter Size | No. of Angled Axially-Extending Slots | No. of Substantially Vertical Axially-Extending Slots | Slot Area (in^2) | Nominal Circumference (in) | Nominal Shell Area (in^2) | Total Slot Area / Nominal Circumference Ratio (in) | Total Slot Area / Total Nominal Shell Area |
|---|---|---|---|---|---|---|---|
| 9/16 | 0 | 1 | 0.3452 | 1.7672 | 3.2975 | 0.1953 | 10% |
| 5/8 | 0 | 1 | 0.3452 | 1.9635 | 3.6639 | 0.1758 | 9% |
| 11/16 | 0 | 1 | 0.3452 | 2.1598 | 4.0303 | 0.1598 | 9% |
| 3/4 | 0 | 1 | 0.3452 | 2.3562 | 4.3967 | 0.1465 | 8% |
| 20mm | 0 | 1 | 0.3452 | 2.4737 | 4.6159 | 0.1395 | 7% |
| 13/16 | 0 | 1 | 0.3452 | 2.5525 | 4.7631 | 0.1352 | 7% |
| 7/8 | 0 | 2 | 0.6904 | 2.7489 | 5.1294 | 0.2512 | 13% |
| 15/16 | 0 | 2 | 0.6904 | 2.9452 | 5.4958 | 0.2344 | 13% |
| 1 | 0 | 2 | 0.6904 | 3.1416 | 5.8622 | 0.2198 | 12% |
| 1-1/16 | 0 | 2 | 0.6904 | 3.3379 | 6.2286 | 0.2068 | 11% |
| 1-1/8 | 0 | 2 | 0.6904 | 3.5343 | 6.5950 | 0.1953 | 10% |
| 1-3/16 | 0 | 2 | 0.6904 | 3.7306 | 6.9614 | 0.1851 | 10% |
| 1-1/4 | 0 | 2 | 0.6904 | 3.9270 | 7.3278 | 0.1758 | 9% |
| 1-5/16 | 0 | 2 | 0.6904 | 4.1233 | 7.6942 | 0.1674 | 9% |
| 1-3/8 | 0 | 2 | 0.6904 | 4.3197 | 8.0605 | 0.1598 | 9% |
| 1-7/16 | 0 | 2 | 0.6904 | 4.5160 | 8.4269 | 0.1529 | 8% |
| Min | | | 0.3452 | 1.7672 | 3.2975 | 0.1352 | 7% |
| Max | | | 0.6904 | 4.5160 | 8.4269 | 0.2512 | 13% |

HOLE CUTTER WITH CHIP EGRESS APERTURE

CROSS-REFERENCE TO RELATED APPLICATIONS

This application is a continuation of U.S. patent application Ser. No. 17/032,815, filed Sep. 25, 2020, which is a continuation of U.S. patent application Ser. No. 16/265,361, filed Feb. 1, 2019, which is a continuation of U.S. patent application Ser. No. 15/709,614, filed Sep. 20, 2017, which is a continuation of U.S. patent application Ser. No. 13/006,117 filed Jan. 13, 2011, which is a continuation-in-part of U.S. patent application Ser. No. 12/687,078 filed Jan. 13, 2010, each of which are incorporated by reference in their entireties as if fully set forth herein.

FIELD OF THE INVENTION

The present invention relates to hole cutters, and more particularly, to hole cutters with apertures formed in the side walls thereof.

BACKGROUND INFORMATION

A typical prior art hole cutter includes a cylindrical blade body defining a plurality of saw teeth on the cutting edge of the blade body, and one or more apertures formed through an intermediate portion of the blade body. Typically, smaller diameter hole cutters have fewer apertures formed through the blade bodies, and larger diameter hole cutters have more apertures formed through the blade bodies. The apertures formed through prior art hole cutter blade bodies may define a variety of different configurations to facilitate inserting a tool into the apertures, such as a screw driver, to remove circular work piece slugs from the interiors of the blade bodies.

One of the drawbacks encountered with prior art hole cutters is that chips or dust, particularly when cutting wood, collects within the interiors of the hole cutters between the work piece slugs and the caps on the non-working ends of the hole cutters. The apertures formed in the side walls of the blade bodies are designed to allow the insertion of screw drivers or like tools to remove work piece slugs, but are not configured to allow the chips or dust generated during cutting to flow through the apertures and away from the interiors of the blade bodies. The chips and dust that collect within the interiors of the blade bodies can become compacted and rapidly fill the hole cutters. Chips and dust also collect at the interfaces between the blade bodies and work pieces, such as between the external surfaces of the blade bodies and the work pieces. The chips and dust that collect at the interfaces of the blades bodies and work pieces can become heated due to frictional forces created between the rotating blade bodies, collected chips and dust, and work pieces. The thermal energy created by such frictional forces can be sufficient to cause the paints or coatings on the external surfaces of the blade bodies to become soft or gooey. The collection of chips and dust within the interiors of the blade bodies and/or at the interfaces of the blade bodies and work pieces can significantly reduce the cutting efficiency and overall cutting speed and/or blade life of such hole cutters.

Although many prior art hole cutters include one or more apertures formed through the side walls of the blade bodies, the apertures are not configured to facilitate the flow of chips from the interiors of the blade bodies into and/or through the apertures. In some such hole cutters, the apertures are spaced too far from the cutting edge, such that the chips generated at the cutting edge become packed between the interior of the blade body and the work piece slug prior to reaching the aperture(s). In other such hole cutters, the apertures are too small to allow any material volume of chips to flow into the apertures and/or through the apertures such that the apertures do not materially impact chip egress. In other such hole cutters, the apertures are not configured to cause the chips to flow into or through the apertures and away from the cutting edge and interiors of the blade bodies.

Accordingly, it is an object of the present invention to overcome one or more of the above-described drawbacks and/or disadvantages of the prior art.

SUMMARY OF THE INVENTION

In accordance with a first aspect, the present invention is directed to a hole cutter or hole saw for cutting a work piece. The hole cutter comprises a substantially cylindrical blade body defining a blade body circumference, a cutting edge formed on one end of the blade body, and an axially-elongated aperture or slot formed through the substantially cylindrical blade body. The axially-elongated slot is configured to receive chips flowing from the cutting edge within the interior of the blade body and (i) into the slot, and/or (ii) through the slot, to prevent the collection of such chips within the interior of the blade body and/or at an interface between the blade body and work piece. The axially-elongated slot defines a first end adjacent to the cutting edge and axially spaced therefrom a first distance within the range of about $15/100$ inch to about $3/8$ inch, a second end axially spaced from the cutting edge a second distance that is greater than the first distance and is at least about one inch, and a slot area. The hole cutter further defines one of the following: (i) the substantially cylindrical blade body defines a diameter of about $13/16$ inch or less, only one of the axially-elongated slots is formed through the blade body, and the slot area to blade body circumference ratio is at least about 0.15; (ii) the substantially cylindrical blade body defines a diameter within the range of about $7/8$ inch to about $17/16$ inches, only two of the axially-elongated slots are formed through the blade body and are angularly spaced relative to each other, and the slot area to blade body circumference ratio is at least about 0.18; (iii) the substantially cylindrical blade body defines a diameter within the range of about $1\frac{1}{2}$ inches to about $3\frac{3}{8}$ inches, at least two of the axially-elongated slots are formed through the blade body and are angularly spaced relative to each other, and the slot area to blade body circumference ratio is at least about 0.1; and (iv) the substantially cylindrical blade body defines a diameter of about $3\frac{1}{2}$ inches or greater, more than two of the axially-elongated slots are formed through the blade body and are angularly spaced relative to each other, and the slot area to blade body circumference ratio is at least about 0.1.

In accordance with another aspect, the hole cutter defines one of the following: (i) the substantially cylindrical blade body defines a diameter of about $13/16$ inch or less, only one of the axially-elongated slots is formed through the blade body, and the slot area to blade body circumference ratio is at least about 0.13; (ii) the substantially cylindrical blade body defines a diameter within the range of about $7/8$ inch to about $17/16$ inches, only two of the axially-elongated slots are formed through the blade body and are angularly spaced relative to each other, and the slot area to blade body circumference ratio is at least about 0.15; (iii) the substantially cylindrical blade body defines a diameter within the range of about 1½ inches to about 3⅜ inches, at least two of the axially-elongated slots are formed through the blade body and are angularly spaced relative to each other, and the slot area to blade body circumference ratio is at least about 0.1; and (iv) the substantially cylindrical blade body defines a diameter of about 3½ inches or greater, more than two of the axially-elongated slots are formed through the blade body and are angularly spaced relative to each other, and the slot area to blade body circumference ratio is at least about 0.1.

In the currently preferred embodiments of the present invention, the hole cutter defines one of the following: (i) the substantially cylindrical blade body defines a diameter of about 13⁄16 inch or less, and the axially-elongated slot defines a slot area to blade body circumference ratio within the range of about 0.15 to about 0.25; (ii) the substantially cylindrical blade body defines a diameter within the range of about ⅞ inch to about 17⁄16 inches, and the two axially-elongated slots define a slot area to blade body circumference ratio within the range of about 0.2 to about 0.33; (iii) the substantially cylindrical blade body defines a diameter within the range of about 1½ inches to about 3⅜ inches, and the two or more axially-elongated slots define a slot area to blade body circumference ratio within the range of about 0.1 to about 0.33; and (iv) the substantially cylindrical blade body defines a diameter of about 3½ inches or greater, and the two or more axially-elongated slots define a slot area to blade body circumference ratio within the range of about 0.1 to about 0.25.

In some embodiments of the present invention, the hole cutter defines a direction of rotation that is the cutting direction of the cutting edge, and the first end of the axially-elongated slot defines an edge surface that slopes away from the cutting edge in a direction opposite the cutting direction. Preferably, the first end defines a maximum width of at least about ⅖ inch, the sloped surface is at least about ⅖ inch long, and the sloped surface is at least one of curvilinear and rectilinear. In some such embodiments, the sloped surface is oriented at an acute angle relative to an axis of the blade body within the range of about 35° to about 60°.

In some embodiments of the present invention, the hole cutter defines a direction of rotation that is the cutting direction of the cutting edge, and the second end of the slot is angularly spaced relative to the first end in a direction opposite the cutting direction. The axially-elongated slot is oriented at an acute angle relative to an axis of the blade body. The acute angle is preferably at least about 30°, and more preferably is within the range of about 35° to about 60°.

In the currently preferred embodiments of the present invention, the hole cutter defines one of the following: (i) the diameter of the substantially cylindrical blade body is about 17⁄16 inches or less, and the axially-elongated slot is oriented substantially parallel to an axis of the blade body, and (ii) the diameter of the substantially cylindrical blade body is greater than about 17⁄16 inches, and each axially-elongated slot is oriented at an acute angle relative to an axis of the blade body and slopes away from the cutting edge in a direction opposite a cutting direction.

In accordance with another aspect, the present invention is directed to a hole cutter for cutting a work piece. The hole cutter comprises a substantially cylindrical blade body defining a blade body circumference, a cutting edge formed on one end of the blade body, and means formed through the substantially cylindrical blade body for receiving chips flowing from the cutting edge within the interior of the blade body and (i) into the means, and/or (ii) through the means, for preventing the collection of such chips within the interior of the blade body and/or at an interface between the blade body and work piece. The means defines a first end adjacent to the cutting edge and axially spaced therefrom a first distance within the range of about 15⁄100 inch to about ⅜ inch, a second end axially spaced from the cutting edge a second distance that is greater than the first distance and is at least about one inch, and an area. The hole cutter defines one of the following: (i) the substantially cylindrical blade body defines a diameter of about 13⁄16 inch or less, only one of said means is formed through the blade body, and the means area to blade body circumference ratio is at least about 0.15; (ii) the substantially cylindrical blade body defines a diameter within the range of about ⅞ inch to about 17⁄16 inches, only two of said means are formed through the blade body and are angularly spaced relative to each other, and the means area to blade body circumference ratio is at least about 0.18; (iii) the substantially cylindrical blade body defines a diameter within the range of about 1-½ inches to about 3⅜ inches, at least two of said means are formed through the blade body and are angularly spaced relative to each other, and the means area to blade body circumference ratio is at least about 0.1; and (iv) the substantially cylindrical blade body defines a diameter of about 3½ inches or greater, more than two of said means are formed through the blade body and are angularly spaced relative to each other, and the means area to blade body circumference ratio is at least about 0.1.

In accordance with yet another aspect, the hole cutter defines one of the following: (i) the substantially cylindrical blade body defines a diameter of about 13⁄16 inch or less, only one of said means is formed through the blade body, and the means area to blade body circumference ratio is at least about 0.13; (ii) the substantially cylindrical blade body defines a diameter within the range of about ⅞ inch to about 17⁄16 inches, only two of said means are formed through the blade body and are angularly spaced relative to each other, and the means area to blade body circumference ratio is at least about 0.15; (iii) the substantially cylindrical blade body defines a diameter within the range of about 1½ inches to about 3⅜ inches, at least two of said means are formed through the blade body and are angularly spaced relative to each other, and the means area to blade body circumference ratio is at least about 0.1; and (iv) the substantially cylindrical blade body defines a diameter of about 3½ inches or greater, more than two of said means are formed through the blade body and are angularly spaced relative to each other, and the means area to blade body circumference ratio is at least about 0.1.

In the currently preferred embodiments of the present invention, the hole cutter defines one of the following: (i) the substantially cylindrical blade body defines a diameter of about 13⁄16 inch or less, and the means defines a means area to blade body circumference ratio within the range of about 0.15 to about 0.25; (ii) the substantially cylindrical blade body defines a diameter within the range of about ⅞ inch to about 17⁄16 inches, and the two means define a means area to blade body circumference ratio within the range of about 0.2 to about 0.33; (iii) the substantially cylindrical blade body defines a diameter within the range of about 1½ inches to about 3⅜ inches, and the two or more means define a means area to blade body circumference ratio within the range of about 0.1 to about 0.33; and (iv) the substantially cylindrical blade body defines a diameter of at least about 3½ inches or greater, and the three or more means define a means area to blade body circumference ratio within the range of about 0.1 to about 0.25. In the currently preferred embodiments, each means is an axially-elongated aperture or slot.

One advantage of the hole cutters of the present invention is that the first ends of the axially-elongated slots or like means are axially spaced adjacent to the cutting edge a first distance within the range of about $^{15}/_{100}$ inch to about $^{3}/_{8}$ inch, and the second ends of the slots or like means are axially spaced from the cutting edge a second distance that is greater than the first distance. The second distance is at least about 1½ inches. As a result, the chips flowing from the cutting edges within the interiors of the blade bodies are allowed to flow into the slots or like means and/or through the slots or like means to, in turn, prevent the collection of such chips within the interiors of the blade bodies and/or at an interface between the blade bodies and work pieces. The relatively close spacing of the first end of each slot or like means to the cutting edge (about $^{15}/_{100}$ inch to about $^{3}/_{8}$ inch) facilitates the flow of chips into the slot or like means, and the depth of the slot or like means from the cutting edge (at least about 1½ inches) facilitates the flow of chips into and/or through the slot or like means for a wide variety of work piece thicknesses. Yet another advantage of the hole cutters of the present invention is that they define significant slot area to cylindrical blade body circumference ratios of at least about 0.1, and in many sizes of hole cutters, at least about 0.15 or 0.2, which in turn gives rise to substantial slot areas per given blade body diameters. As a result, the relatively large areas of the slots or like means, in combination with the close placement of the first or inlet ends of the slots or like means relative to the cutting edges of the hole cutters, facilitates the flow of chips into and/or through the slots, and in turn prevents the collection of such chips within the interiors of the hole cutters. The relatively large slot areas facilitate in preventing the slots from becoming clogged with chips and/or allow the slots themselves to retain a significant volume of chips, that otherwise would be trapped within the interiors of the blade bodies. Accordingly, the hole cutters of the present invention provide significantly improved chip removal or egress from the interiors of the blade bodies in comparison to prior art hole cutters which, in turn, can lead to significantly improved cutting speeds and/or blade life. Another advantage of some currently preferred embodiments of the present invention is that the slots or like means are oriented at acute angles relative to the axes of the hole cutters to facilitate the flow of chips up and/or through the slots and thus away from the interiors of the blade bodies. Yet another advantage of some currently preferred embodiments of the present invention is that the first or inlet ends of the slots define edge surfaces that slope away from the cutting edge in a direction opposite the cutting direction of the hole cutters to further facilitate the flow of chips up and/or through the slots and thus away from the interiors of the blade bodies.

Other objects and advantages of the hole cutters of the present invention, and/or of the currently preferred embodiments thereof, will become more readily apparent in view of the following detailed description of the currently preferred embodiments and the accompanying drawings.

BRIEF DESCRIPTION OF THE DRAWINGS

FIG. 4 is a table of parameters of exemplary hole cutters embodying the present invention.

FIG. 6 is a table of parameters of exemplary hole cutters embodying the blade body of FIG. 5.

DETAILED DESCRIPTION OF PREFERRED EMBODIMENTS

Figure 1:
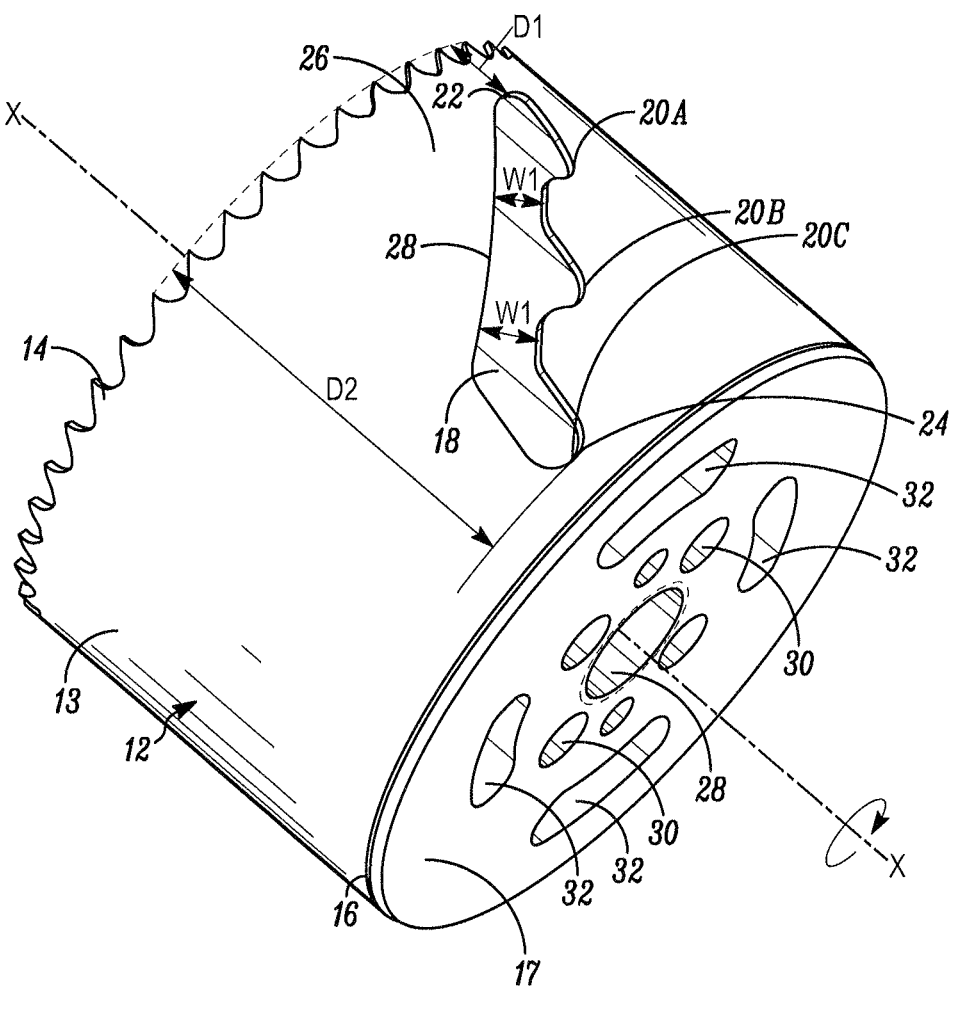
FIG. 1 is a perspective view of a hole cutter embodying the present invention.
Figure 2:
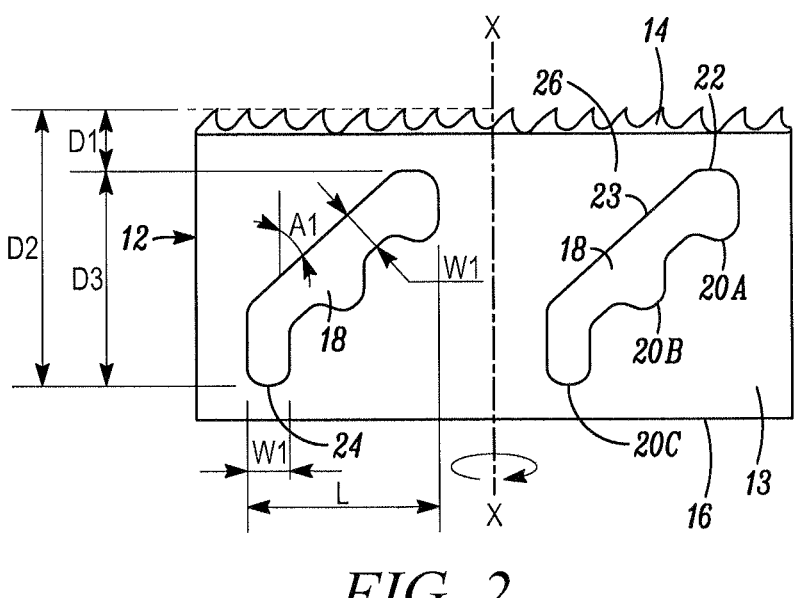
FIG. 2 is a side elevational view of the blade body of the hole cutter of FIG. 1 prior to being formed into a cylindrical shape.

In FIG. 1, a hole cutter embodying the present invention is indicated generally by the reference numeral 10. The term "hole cutter" is used herein to mean a tool that cuts holes in work pieces, such as wood or metal work pieces, and includes without limitation hole saws. The hole cutter 10 includes a blade body 12 defining a side wall 13. The blade body 12 is shown in FIG. 2 in its flattened state; however, as shown in FIG. 1, the blade body 12 is rolled or otherwise formed into a substantially cylindrical shape to form the hole cutter 10. As shown in FIG. 1, the side wall 13 extends around an axis of rotation "X" of the hole cutter 10 to define the substantially cylindrical blade body 12. One end of the blade body 12 is provided with a cutting edge 14 oriented substantially perpendicular to the axis of rotation X, and the opposing end of the blade body defines a rim 16. As shown in FIG. 1, a cap 17 is fixedly secured, such as by welding, to the rim 16 to enclose the respective end of the hole cutter 10, which is referred to herein as the "non-working" end of the hole cutter. The cap 17 includes a central hub 28 defining a threaded aperture for threadedly engaging an arbor, a plurality of drive pin apertures 30 substantially equally spaced relative to each other about the central hub 28 for engaging the drive pins of the arbor, and a pair of angularly-extending apertures 32 spaced about 180° apart on opposite sides of the hub 28 relative to each other. The angularly-extending apertures 32 are dimensioned and positioned to allow insertion therein of a tool, such as a screw driver, to facilitate work piece slug removal.

As shown in FIGS. 1 and 2, the cutting edge 14 is defined by a plurality of cutting teeth with gullets extending between the teeth. The cutting teeth are configured to cut into a work piece when the cutter 10 is applied to a work piece and rotated about the axis of rotation X in a cutting direction. In the currently preferred embodiments, the cutting edge 14 is a bi-metal cutting edge that includes a cutting edge wherein the tips of the teeth are formed by a relatively hard metal, such as tool steel, and the other portions of the teeth and blade body are made of relatively softer steel, such as carbon steel. However, as may be recognized by those of ordinary skill in the pertinent art based on the teachings herein, the cutting edge 14 may be defined by any of numerous different tooth forms or other cutting edge forms that are currently known or that later become known. Similarly, although the blade body 12 is shown as being formed from sheet metal that is rolled or otherwise formed into the cylindrical blade body 12 and is, in turn, welded or otherwise attached to the cap 17, the hole cutter 10 may be formed in any of numerous other ways that are currently known, or that later become known. For example, the end cap 17 and side wall 13 may be spun, drawn, molded or otherwise formed in one integral part.

As shown in FIGS. 1 and 2, the blade body 12 defines two axially-elongated apertures or slots 18 formed through the side wall 13 thereof. As can be seen, the two slots 18 are angularly spaced relative to each other on the cylindrical blade body 12. In the illustrated embodiment, the two slots 18 are approximately equally spaced relative to each other, i.e., the two slots are spaced about 180° relative to each other. Each axially-elongated aperture or slot 18 is configured to receive therethrough a lever, such as a screw driver, for removal of a work piece slug located within the interior of the blade body 12. In various embodiments of the invention, each slot 18 has an axial depth D3 (D2-D1) ranging from about 1⅛ inches to about 1⅘ inches. In the illustrated embodiment, each slot 18 has an axial depth D3 of about 1⅓ inches. In certain embodiments, each slot 18 has a circumferential length L ranging from about ⅖ inch to about 1⅘ inches.

As shown in FIGS. 1 and 2, each slot 18 includes three fulcrums 20A, 20B and 20C axially and angularly spaced relative to each other. The fulcrums 20A, 20B and 20C are defined by recessed radiused edge surfaces of the side wall 13 that are formed on the edge of the respective slot 18 that is adjacent to, or on the side of, the non-working end of the hole cutter 10. The first fulcrum 20A is located adjacent to the cutting edge 14, the second fulcrum 20C is spaced furthest from the cutting edge 14 and located adjacent to the non-working end of the hole cutter and is angularly spaced from the first fulcrum 20A in a direction opposite to the cutting direction, and the third fulcrum 20C is located axially and angularly between the first and second fulcrums 20A and 20C, respectively.

The number of slots 18 formed through the side wall 13 of the hole cutter 10 depends on the size of the hole cutter. As a general rule, the larger the diameter of the hole cutter, the greater is the number of axially-elongated apertures or slots 18 that can be formed through the cylindrical blade body 12. In the currently preferred embodiments of the present invention, relatively small diameter hole cutters (e.g., about 9/16 inch in diameter to about 13/16 inch in diameter) have one slot 18 oriented substantially parallel to the axis X of the hole cutter, larger diameter hole cutters have two slots 18 (e.g., about ⅞ inch in diameter to about 1 7/16 inches in diameter) oriented substantially parallel to the axis X of the hole cutter, still larger diameter hole cutters (e.g., about 1½ inches in diameter to about 3⅜ inches in diameter) have two larger area slots 18 that are oriented at acute angles relative to the axis X of the hole cutter, and still larger diameter hole cutters (e.g., about 3½ inches in diameter to about 6 inches in diameter) have four larger area slots 18 oriented at acute angles relative to the axis X of the hole cutter. In the embodiment of FIGS. 1 and 2, the diameter of the hole cutter 10 is sufficient to include two axially-extending slots 18 oriented at acute angles relative to the axis X of the hole cutter. Accordingly, each axially-extending slot 18 shown in FIGS. 1 and 2 is oriented at an acute angle "A" with respect to the axis X of the hole cutter. In the currently preferred embodiments, the angle A is at least about 30°, and is preferably within the range of about 35° to about 60°. In the illustrated embodiment, the acute angle A is about 47°. As may be recognized by those of ordinary skill in the pertinent art based on the teachings herein, these angles are only exemplary, and any of numerous other angles equally may be employed.

In the currently preferred embodiments of hole cutters having multiple slots 18, the slots 18 are approximately equally spaced relative to each other about the axis X of the hole cutter, i.e., if there are two slots 18 they are angularly spaced about 180° relative to each other, if there are three slots 18 they are angularly spaced about 120° relative to each other, if there are four slots 18 they are angularly spaced about 90° relative to each other, etc. However, as may be recognized by those of ordinary skill in the pertinent art based on the teachings herein, the slots 18 need not be equally spaced relative to each other, nor do all apertures or slots 18 on the same hole cutter need to define the same aperture or slot configuration or size.

As shown in FIGS. 1 and 2, each slot 18 defines a first or inlet end 22 that is adjacent to the cutting edge 14, and a second or outlet end 24 that is axially spaced further away from the cutting edge 14 than the first end 22 and is angularly spaced relative to the first end 22 in a direction opposite to the cutting direction. The first end 22 is axially spaced from a plane defined by the cutting edge 14 a first distance D1 within the range of about 15/100 inch to about ⅜ inch. One advantage of this configuration is that the inlet end 22 of each axially-extending slot 18 is spaced closely adjacent to the cutting edge 14 to receive chips flowing from the cutting edge 14 within the interior of the blade body 12 and into the slot 18 and/or through the slot 18, to, in turn, prevent the collection of such chips within the interior of the blade body 12 and/or at an interface between the blade body 12 and work piece. Yet another advantage of this configuration is that the angular orientation of the axially-extending slots 18 facilitates in allowing the chips to flow up through the slots 18 and away from the cutting edge 14 and interior of the blade body 12 as the hole cutter 10 is rotated during a cutting operation. A further advantage of the illustrated blade body 12 is that the inlet end 22 of each slot 18 is axially spaced adjacent to the cutting edge 14 such that a solid or substantially solid annular portion 26 of the blade body 12 extends annularly about the blade body and axially between the cutting edge 14 and the first end 22 of each slot 18. This annular portion 26 of the blade body 12 advantageously provides the blade body 12 with sufficient strength to withstand the heat applied to the blade body 12 during the manufacturing of the hole cutter without distorting the blade body, and provides sufficient strength to the hole cutter 12 to withstand the forces encountered during cutting operations. However, the annular portion 26 of the blade body 12 is sufficiently thin (as indicated above, D1 is within the range of about 15/100 inch to about ⅜ inch) to allow the chips and dust generated at the cutting edge 14 to flow into the slots 18 and away from the interior of the blade body 12. In the currently preferred embodiments, the outlet or second end 24 of each slot 18 is axially spaced from the cutting edge a second distance D2 of at least about 1 inch, and preferably at least about 1½ inches. In the illustrated embodiment, the distance D2 is about 1¾ inches.

The term "chip" is used herein to mean small particles of a work piece formed upon cutting the work piece with the hole cutter, and including without limitation, saw dust, wood dust, wood chips, metal dust, metal chips, dust and/or chips created upon cutting work pieces formed of materials other than wood or metal, and/or including materials or components in addition to wood or metal.

In the illustrated embodiment, the distances D1 and D2 are measured from a plane extending between the tips of unset teeth. However, as may be recognized by those of ordinary skill in the pertinent art based on the teachings herein, these distances, or the distances between other features of the hole cutter 10 and the cutting edge 14, may be measured with respect to any of numerous other reference lines or features that are currently known or used, or that later become known or used, such as from the base of the deepest gullets of the cutting teeth.

As shown in FIG. 2, each axially-extending aperture or slot 18 includes a sloped side edge surface 28 that is angled away from the cutting edge 14 in a direction opposite the cutting direction and spaced opposite the fulcrums 20A, 20B and 20C. In the illustrated embodiment, the sloped side edge 28 of each slot 18 is substantially smooth and rectilinear to facilitate sliding movement of a tool into and through the slot 18 (e.g., from one fulcrum 20A, 20B or 20C to another to progressively remove a slug) and to facilitate chip and/or dust egress through the slot 18. The sloped side edge 28 is spaced from the fulcrums 20A, 20B and 20C such that each slot 18 defines a minimum width W1 of about 0.27 inch to allow insertion and translation of a number 2 screwdriver therethrough.

As described above and shown in FIGS. 1 and 2, the angled or sloped edge surface 28 is angled with respect to the axis X of the hole cutter from the first or inlet end 22 to the second or outlet end 24 in a direction opposite the cutting direction. Therefore, in such an arrangement as shown in FIGS. 1 and 2, the diameter of the substantially cylindrical blade body 12 is at least about 1½ inches, the second or outlet end 24 of the slot 18 is angularly spaced relative to the first or inlet end 22 such that the slot 18 slopes away from the cutting edge 14 in a direction opposite to the cutting direction, and the slot 18 is oriented at an acute angle relative to the axis of rotation X of at least about 30°.

Figure 3:
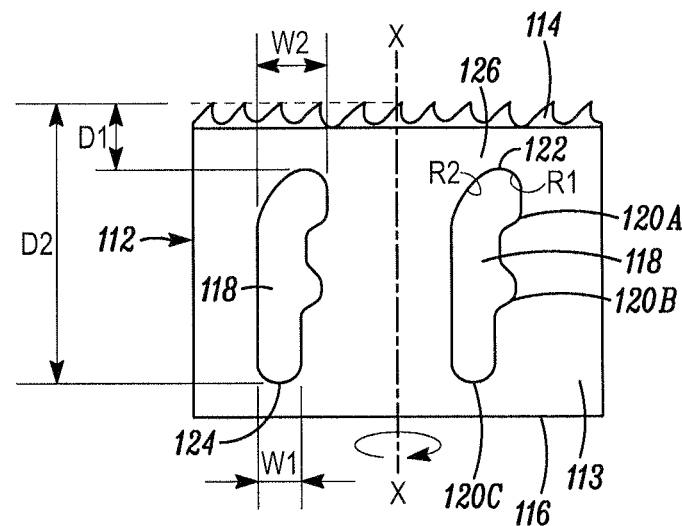
FIG. 3 is a side elevational view of another embodiment of a blade body of the present invention prior to being formed into a cylindrical shape.

In FIG. 3, another embodiment of a blade body of the present invention is indicated generally by the reference numeral 112. The blade body 112 is shown in its flattened state; however, as shown in FIG. 1 with respect to the blade body 12 of FIG. 1, and as will be recognized by those of ordinary skill in the pertinent art based on the teachings herein, the blade body 112 is rolled or otherwise formed into a substantially cylindrical shape to form a hole cutter. The blade body 112 is substantially the same as the blade body 12 described above in connection with FIGS. 1 and 2, and therefore like reference numerals preceded by the numeral "1" are used to indicate like elements. The primary difference of the blade body 112 in comparison to the blade body 12 described above is that the two axially-extending apertures or slots 118 formed in the blade body 112 are oriented substantially parallel to the axis of rotation X of the hole cutter. In the illustrated embodiment, the blade body 112 is used to form "small diameter" hole cutters defining blade body diameters within the range of about ⅞ inch to about 1⁷⁄₁₆ inches. As the blade body 112 forms a relatively small diameter hole cutter, the slots 118 cannot define as large a slot area as the larger diameter hole cutters described above, and/or cannot be oriented at acute angles relative to the axis of rotation X of the hole cutter. The currently preferred embodiments of smaller diameter hole cutters (e.g., about ¹³⁄₁₆ inch in diameter or less) define the same slot configuration as illustrated in FIG. 3, but include only one such slot 118. Thus, the blade body 12 of FIGS. 1 and 2 forms a "large diameter" hole cutter (a hole cutter defining a diameter of at least about 1½ inches), while the blade body 112 of FIG. 3 forms a "small diameter" hole cutter (a hole cutter defining a diameter less than 1½ inches).

Another difference of the blade body 12 in comparison to the blade body 112 described above is in the configuration of the sloped edge surface 128 of the first or inlet end 122 of each slot 118. As can be seen, the first or inlet end 122 of each slot 118 is defined by two curvilinear regions. A first curvilinear region is contiguous to a side edge of the first fulcrum 220A and is defined by one or more relatively small radii R1. A second curvilinear region is contiguous to the first curvilinear region and is defined by one or more larger radii R2. As can be seen, the larger radius R2 imparts a shape to the respective edge of the slot 118 that slopes away from the cutting edge 114 in a direction opposite the cutting direction of the blade 112. In addition, the location and orientation of the first fulcrum 120A, the respective side and the sloped edge surface imparts a relatively wide inlet 122 to the slot 118 to facilitate the flow of chips or dust from the cutting edge 114 into the slot 118. In the illustrated embodiment, the width W2 at the inlet 122 of the slot 118 is within the range of about ⅕ to about ⅗ inch, and in the illustrated embodiment is about ⅖ inch.

As shown in the table of FIG. 4, the hole cutters of the present invention define significant slot area to cylindrical blade body circumference ratios of at least about 0.1, and in many sizes of hole cutters, at least about 0.15 or 0.2, which in turn gives rise to substantial slot areas per given blade body diameters. The relatively large areas of the slots 18, 118, in combination with the close placement of the first or inlet ends 22, 122 of the slots relative to the cutting edges 14, 114 of the hole cutters, facilitates the flow of chips into and/or through the slots, and in turn prevents the collection of such chips within the interiors of the hole cutters. Accordingly, as shown in FIG. 4, in the illustrated embodiments, the number of slots and/or the configurations of the slots vary depending upon the diameters of the hole cutters in order to maximize the slot area to cylindrical blade body circumference ratios of the hole cutters, and in turn facilitate chip egress into and/or through the slots and thereby improve the cutting efficiency and/or blade life of the hole cutters.

The terms "nominal shell area" and "nominal circumference" in FIG. 4 relate to the "size" of the hole cutters. The "size" of a hole cutter is used herein to mean the diameter of the hole that the cutter will cut into a work piece. Therefore, the nominal diameters and nominal circumferences of the hole cutters shown in FIG. 4 are not the actual, measurable diameters and circumferences of the blade bodies, but rather are the diameters and circumferences of the holes formed by the hole cutters in work pieces. For example, the cutting teeth of a certain size cutter may be angled or set radially outwardly relative to the side wall of the blade body, and therefore the cutter will create a hole in a work piece that defines a diameter that is larger than the diameter of the blade body. Accordingly, the "size" of a particular hole cutter can vary from the diameter of the cylindrical blade body of the hole cutter. However, because the measurable dimensions of the blade body of most hole cutters differ from the corresponding "sizes" of the hole cutters by relatively small or insignificant amounts, the "nominal shell area" and the "nominal circumference" are useful metrics. In FIG. 4, the nominal circumference was calculated by multiplying each hole cutter's size (the diameter of a hole created by the hole cutter) by 2n. Similarly, the nominal shell area was calculated by multiplying the nominal circumference by the nominal height of the shell or blade body, which in the illustrated embodiments was about 1.866 inches.

As shown in FIG. 4, the ratio of the total slot area to the nominal circumference of the hole cutters, calculated as described above, varies depending on the size of the hole cutter, but is at least about 0.1 inch. The slots 118 shown in FIG. 3 are referred to herein as "smaller configuration" slots, and the slots 18 of FIG. 2 are referred to herein as "larger configuration" slots. In the currently preferred embodiments, all smaller configuration slots are the same size and shape regardless of the diameters of the smaller hole cutters, and all larger configuration slots are the same size and shape regardless of the diameters of the larger hole cutters.

The currently preferred embodiments of "small" hole cutters defining diameters of about ¹³⁄₁₆ inch or less include only one small configuration slot 118 formed through the blade body. These "small" hole cutters define a slot area to blade body circumference ratio that is at least about 0.15, and more preferably is within the range of about 0.15 to about 0.25. The area of each small configuration slot is within the range of about ³⁄₁₀ inch to about ½ inch, and in the illustrated embodiments, the area of each smaller configuration slot 118 is about ⅖ inch. As described above, the smaller configuration slots 118 are oriented substantially parallel to the axis X of the hole cutter.

As also shown in FIG. 4, the currently preferred embodiments of the "small" hole cutters defining diameters within the range of about ⅞ inch to about 1⁷⁄₁₆ inches include two smaller configuration slots 118 formed through the blade body and angularly spaced relative to each other. These "small" hole cutters define a slot area to blade body circumference ratio that is at least about 0.2, and more preferably is within the range of about 0.2 to about 0.33. Each small configuration slot 118 of these "small" hole cutters is the same size and configuration as the slots 118 of the smaller diameter hole cutters (i.e., having diameters of about ¹³⁄₁₆ inch or less); however, because these hole cutters are larger they include two such smaller configuration slots. The total area of the smaller configuration slots 118 of these "small" hole cutters is within the range of about ⅗ to about 1 inch, and in the illustrated embodiments, the total area of the slots is about ⅘ inch. As shown in FIG. 3, the smaller configuration slots 118 of these "small" hole cutters are oriented substantially parallel to the axis of rotation X of the hole cutters.

As further shown in FIG. 4, the currently preferred embodiments of "larger" hole cutters defining diameters within the range of about 1½ inches to about 3⅜ inches include two larger configuration slots 18 formed through the blade body and angularly spaced relative to each other. The slot area to blade body circumference ratio of these larger diameter hole cutters is at least about 0.1, and more preferably is within the range of about 0.1 to about 0.33. The currently preferred embodiments of these larger diameter hole cutters include two larger configuration slots 18 angularly spaced about 180° relative to each other. The area of each larger configuration slot 118 is within the range of about Vi inch to about 0.625 inch, and in the illustrated embodiments is about 0.564 inch. Accordingly, the area of the two larger configuration slots 18 is within the range of about 1 inch to about 1¼ inches, and in the illustrated embodiments, is about 1⅛ inches. As described above, each larger configuration slot 18 is oriented at an acute angle relative to the axis of rotation X of the respective hole cutter.

As also shown in FIG. 4, the currently preferred embodiments of "large" hole cutters defining diameters of about 3½ inches or greater include four larger configuration slots 18 formed through the blade body and angularly spaced about 90° relative to each other. Each of these "larger" hole cutters defines a slot area to blade body circumference ratio that is at least about 0.1, and more preferably is within the range of about 0.1 to about 0.25. The currently preferred embodiments of these larger diameter hole cutters include two larger configuration slots 18 angularly spaced about 180° relative to each other. The area of the four larger configuration slots 18 is within the range of about 2 inches to about 2½ inches, and in the illustrated embodiments, is about 2¼ inches. As described above, each larger configuration slot 18 is oriented at an acute angle relative to the axis of rotation X of the respective hole cutter.

12

Figure 5:
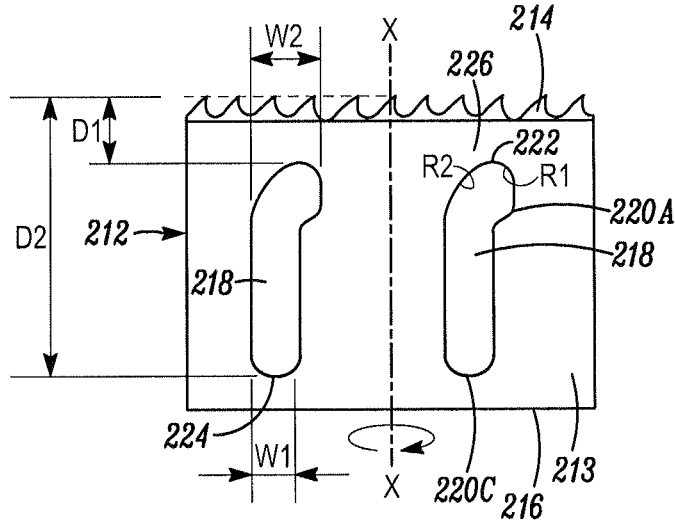
FIG. 5 is a side elevational view of another embodiment of a blade body of the present invention prior to being formed into a cylindrical shape.

In FIG. 5, another embodiment of a blade body of the present invention is indicated generally by the reference numeral 212. The blade body 212 is shown in its flattened state; however, as shown in FIG. 3 with respect to the blade body 112 of FIG. 3, and as will be recognized by those of ordinary skill in the pertinent art based on the teachings herein, the blade body 212 is rolled or otherwise formed into a substantially cylindrical shape to form a hole cutter. The blade body 212 is substantially the same as the blade body 112 described above in connection with FIG. 3, and therefore like reference numerals preceded by the numeral "2", or preceded by the numeral "2" instead of the numeral "1", are used to indicate like elements. As with the hole cutter shown in FIG. 3, in the illustrated embodiment the blade body 212 is used to form "small diameter" hole cutters defining blade body diameters within the range of about ⅞ inch to about 1⁷⁄₁₆ inches. Smaller diameter hole cutters (e.g., about ¹³⁄₁₆ inch in diameter or less) can define only one such slot 218.

The primary difference of the blade body 212 in comparison to the blade body 112 described above is that the axially-extending apertures or slots 218 formed in the blade body 112 have two fulcrums 120A, 120C. This results in a smaller slot area than the slot depicted in FIG. 3. FIG. 6 is similar to FIG. 4 but shows the slot area to cylindrical blade body circumference ratios and slot area to nominal shell area ratios for smaller diameter hole cutters (e.g., less than about 1⁷⁄₁₆ inch diameter) utilizing a "smaller configuration" slot such as shown in FIG. 5. As seen in FIG. 6, utilizing a slot configuration as shown in FIG. 5 still provides a slot area to cylindrical blade body circumference ratio of at least about 0.1, giving rise to substantial slot area per given blade body diameter.

Similar to as described above regarding FIGS. 3 and 4, embodiments of "small" hole cutters defining diameters of about ¹³⁄₁₆ inch or less include only one small configuration slot 218 formed through the blade body. These "small" hole cutters define a slot area to blade body circumference ratio that is at least about 1:8 or about 0.13, and more preferably is within the range of about 1:8 or about 0.13 to about 1:5 or about 0.2. The area of each small configuration slot is still within the range of about ³⁄₁₀ inch to about ½ inch, and in the illustrated embodiments of FIGS. 5 and 6, the area of each smaller configuration slot 218 is about ⅓ inch.

As also shown in FIG. 4, the currently preferred embodiments of the "small" hole cutters defining diameters within the range of about ⅞ inch to about 1⁷⁄₁₆ inches include two smaller configuration slots 218 formed through the blade body and angularly spaced relative to each other. These "small" hole cutters define a slot area to blade body circumference ratio that is at least about 1:7 or about 0.15, and more preferably is within the range of about 1:7 or about 0.15 to about 3:10 or about 0.3. Each small configuration slot 218 of these "small" hole cutters is the same size and configuration as the slots 218 of the smaller diameter hole cutters (i.e., having diameters of about ¹³⁄₁₆ inch or less); however, because these hole cutters are larger they include two such smaller configuration slots. The total area of the smaller configuration slots 218 of these "small" hole cutters is within the range of about ⅗ to about 1 inch, and in the illustrated embodiments, the total area of the slots is about ⁷⁄₁₀ inch.

One advantage of the combination of the location of the inlet or first ends of the slots in relation to the cutting edge (such as the distance between a plane defined by the tips of unset cutting teeth and the inlet edge), the orientation of the slots (such as being angled with respect to a plane defined by the axis of the cutter at an acute angle of at least about 30° and/or including a sloped surface angled away from the cutting direction), and the relatively large slot area to circumference ratios, is that the slots provide for more efficient and effective chip ejection, and therefore, increased cutting efficiency. Another advantage of the hole cutters of the present invention is that the slots can be configured to allow the chips generated during cutting to flow through the slots and away from the interiors of the blade bodies. Yet another advantage of the hole cutters of the present invention is that the slots can prevent the hole cutters from being overcome by the rate at which the chips are generated during cutting and can allow for the proper egress of chips away from the interiors of the hole cutters and/or the interfaces between the blade bodies and work pieces.

The hole cutters of the present invention may include one or more features of the hole cutters disclosed and/or claimed in any of the following patents and patent applications that are assigned to the assignee of the present invention and are hereby expressly incorporated by reference in their entireties as part of the present disclosure: U.S. Pat. No. 8,579,554, issued on Nov. 12, 2013 and entitled "Hole Cutter with Axially-Elongated Aperture Defining Multiple Fulcrums"; U.S. Pat. No. 8,573,907, issued on Nov. 5, 2013 and entitled "Hole Cutter With Minimum Tooth Pitch to Blade Body Thickness Ratio"; U.S. Pat. No. 9,434,033, issued on Sep. 6, 2016 and entitled "Hole Cutter With Extruded Cap"; U.S. Pat. No. 9,586,270, issued on Mar. 7, 2017 and entitled "Coated Hole Cutter"; U.S. Design Pat. No. D690,334, issued on Sep. 24, 2013 and entitled "Hole Saw"; and U.S. Design Pat. No. D659,176, issued on May 8, 2012 and entitled "Hole Saw".

It may be readily understood by those having skill in the pertinent art from the present disclosure that any of numerous changes and modifications may be made to the above-described and other embodiments of the present invention without departing from the scope of the invention as defined in the appended claims. For example, the hole cutters may be made from any of numerous different materials, in any of numerous shapes, taking any of numerous different dimensions. For example the cutting edge may be made from any of numerous different materials or combinations of materials that are currently known or that later become known. As an example, the cutting edge may be a bi-metal cutting edge, such as bi-metal cutting teeth. As another example, the cutting edge may take any form, pattern, arrangement or configuration that is currently known or that later becomes known, including without limitation tooth patterns that tend to function well in specific applications, hybrid applications or general applications. For example, the cutting teeth may define any of numerous different tooth forms, pitch patterns and/or set patterns. As another example, a single aperture may be provided in the body of the cutter, two or more apertures may be angularly and/or axially aligned with one another, or two or more apertures may be variably spaced angularly and/or axially relative to one another. In addition, the hole cutters may define different numbers of axially-elongated apertures, different aperture configurations, shapes and/or sizes than those disclosed herein. Also, the hole cutters may be used in any of numerous different cutting applications, on any of numerous different work piece materials, such as woods, metals, plastics, composites, resins, stones, fabrics, foams, etc. Further, the blade body may not define any elongated apertures or slots, or the apertures or slots may not be contained within the side walls of the cutters. For example, the apertures may extend to the cutting edge, the top rim of the side wall or cap, or may extend to both the cutting edge and top rim of the side wall or cap to define a channel that extends the entire or substantially entire axial extent of the blade body. For another example, the apertures may include fewer than two fulcrums, or more than three fulcrums. As another example, the sloped surface of the inlet portion of the apertures may be curvilinear, rectilinear and/or a combination of curvilinear and rectilinear edge surface regions. Alternatively, the first or inlet end of the slot need not be sloped. Accordingly, this detailed description of the currently preferred embodiments of the present invention is to be taken in an illustrative, as opposed to a limiting sense.

What is claimed is:

1. A method of levering a slug out of an interior of a hole cutter that includes a substantially cylindrical blade body defining a circumference and a longitudinal axis, a cutting edge formed on one end of the blade body, and a plurality of aperture portions through the blade body, the method comprising:

forming a hole in a workpiece by rotating the hole cutter while the cutting edge engages the workpiece and forming the slug in the interior of the hole cutter;

inserting a lever into a first aperture portion of the plurality of aperture portions in the blade body, the first aperture portion spaced from the cutting edge such that a first portion of the blade body lies between the cutting edge and the first aperture portion;

levering the lever against a first fulcrum defined by an edge portion of the first aperture portion to push the slug at least partially out of the interior of the hole cutter by pushing a bottom of the slug toward the cutting edge;

inserting the lever into a second aperture portion of the plurality of aperture portions in the blade body, the second aperture portion spaced from the cutting edge such that a second portion of the blade body lies between the cutting edge and the second aperture portion; and levering the lever against a second fulcrum defined by an edge portion of the second aperture portion to push the slug further out of the interior of the hole cutter by pushing the bottom of the slug toward the cutting edge, wherein the second fulcrum is closer to the cutting edge than the first fulcrum, and wherein the plurality of aperture portions together define an aperture area, and one of: (i) the blade body defines a diameter of 13/16 inches or less and a ratio of the aperture area to the blade body circumference is at least 0.13; (ii) the blade body defines a diameter within a range from 7/8 inch to 1 7/16 inches and a ratio of the aperture area to the blade body circumference is at least 0.18; (iii) the blade body defines a diameter within a range from 1 1/2 inches to 3 3/8 inches and a ratio of the aperture area to the blade body circumference is at least 0.10; and (iv) the blade body defines a diameter of at least 3 1/2 inches and a ratio of the aperture area to the blade body circumference is at least 0.11.

2. The method of claim 1, further comprising moving the lever from the first aperture portion to the second aperture portion via a slot portion connecting the first aperture portion to the second aperture portion.

3. The method of claim 1, wherein at least a portion of the first aperture portion and at least a portion of the second aperture portion are aligned along a line substantially parallel to the longitudinal axis.

4. The method of claim 1, wherein at least a portion of the first aperture portion and at least a portion of the second aperture portion are aligned along a line at an acute angle to the longitudinal axis.

5. The method of claim 1, wherein at least one of the first aperture portion and the second aperture portion is bounded by a bottom edge axially spaced a first distance from the cutting edge, a top edge spaced a second distance from the cutting edge greater than the first distance, and a side edge connecting the bottom edge to the top edge and oriented at an acute angle to the longitudinal axis.

6. The method of claim 1, wherein the first fulcrum is defined by a first edge of the first aperture portion that is curved, and the second fulcrum is defined by a second edge of the second aperture portion that is curved.

7. The method of claim 1, wherein at least one of the first aperture portion and the second aperture portion is axially elongated.

8. The method of claim 1, further comprising inserting the lever into a third aperture portion of the plurality of aperture portions in the blade body that is spaced from the cutting edge such that a third portion of the blade body lies between the cutting edge and the third aperture portion, and levering the lever against a third fulcrum defined by an edge portion of the third aperture portion to push the slug further out of the interior of the hole cutter by pushing the bottom of the slug toward the cutting edge, wherein the third fulcrum is closer to the cutting edge than the second fulcrum.

\* \* \* \* \*